(12) United States Patent
March et al.

(10) Patent No.: US 6,459,783 B1
(45) Date of Patent: *Oct. 1, 2002

(54) INTERNET SERVICE PROVIDER CALL REDIRECTION

(75) Inventors: Sean March, Plano; Jeffrey Chen, Richardson, both of TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/300,130

(22) Filed: Apr. 27, 1999

(51) Int. Cl.[7] .......................... H04M 3/42; H04L 12/66
(52) U.S. Cl. .......................... 379/211.02; 379/221.01; 370/352; 370/401
(58) Field of Search ............. 379/211.01, 211.02, 379/207.02, 219, 220.01, 221.01–221.15, 229, 230, 112.01, 112.08, 112.1, 114.02; 370/351–356, 400–402, 522

(56) References Cited

U.S. PATENT DOCUMENTS

| | | | | |
|---|---|---|---|---|
| 5,933,490 A | * | 8/1999 | White et al. | 379/221.01 |
| 6,115,460 A | * | 9/2000 | Crowe et al. | 370/352 |
| 6,327,358 B1 | * | 12/2001 | March et al. | 370/352 |

FOREIGN PATENT DOCUMENTS

| | | |
|---|---|---|
| EP | 0 802 690 A | 10/1997 |
| WO | WO 97 38551 A | 10/1997 |
| WO | WO 99 13635 A | 3/1999 |

OTHER PUBLICATIONS

Leconte A et al: "Reshaping the IN for multimedia: is there a life after internet?" International A conference on Intelligence in networks, XX,XX, Nov. 1, 1996, pp. 2–6, XP002093850.

Blankers P: "Network Solution For Internet Access Services" Ericsson Review, SE, Ericsson. Stockholm, No. Spec. Int. ISS, 1998, pp. 4–13, XP000751709 ISSN: 0014–0171.

Tao J et al: "Internet Access Via Baseband and Broadband ISDN Gateways" Proceedings of the Annual International Phoenix Conference on Computers and Communications, US, New York, IEEE, vol. Conf. 13, Apr. 12, 1994 pp. 485–490, XP000462600.

* cited by examiner

*Primary Examiner*—Ahmad F. Matar
*Assistant Examiner*—Benny Q. Tieu
(74) *Attorney, Agent, or Firm*—Bruce Garlick

(57) ABSTRACT

A telephone network constructed according to the present invention includes call redirection functions that redirect calls intended for a toll-free-number or central number of an Internet Service Provider (ISP) to one of a plurality of available Internet Protocol (IP) gateways operated by the ISP. Call redirection may be performed within a coupled signaling network during a database lookup or Service Control Point operation, at a signal switching point of a destination switch or by a PBX operated by the ISP. The call redirection may be static or may be dynamic. In static call redirection, all calls are redirected to a single IP gateway. In dynamic call redirection, one of a plurality of available IP gateways is selected based upon operating conditions. In making such selection, IP gateway loading, IP gateway availability, telephone network loading, telephone network availability and telephone network routing costs are considered.

23 Claims, 7 Drawing Sheets

INTERNET SERVICE PROVIDER CALL REDIRECTION

RELATED APPLICATION

The present application is related to, and claims priority to application Ser. No. 09/300,131 filed on even date herewith, now issued on Dec. 4, 2001 as Pat. No. 6,327,358, which is incorporated by reference in its entirety.

BACKGROUND

1. Technical Field

The present invention relates generally to telephone networks and the Internet; and more particularly to the routing of telephone calls within a telephone network to proximately located or preferred gateways that couple the telephone network to the Internet.

2. Related Art

The structure of modern telephone networks often includes a traffic network and a coupled signaling network. The traffic network includes a plurality of switches interconnected by traffic handling trunks. Many of these switches serve as central office switches that couple to a plurality of terminals as well as to other of the plurality of switches. The signaling network interfaces with the traffic network to perform call routing and management functions.

In an example of the manner in which a telephone network services a call, a switch (origination switch) receives a request from a calling terminal that includes a Dialed Number, the calling terminal requesting that the call be completed to a called terminal (associated with the Dialed Number) that is coupled to another switch (destination switch). The origination switch initiates call set up by interacting with the signaling network and requesting that the call be set up and routed to the called terminal (associated with the Dialed Number). During call set up, the origination switch transmits the Dialed Number to the signaling network in a origination message. The signaling network then routes the origination message to a destination switch. The destination switch then attempts to allocate a traffic trunk back to the originating switch. If the allocation is successful, the destination switch notifies the originating switch of such allocation via the signaling network and completes the call to the called terminal (if available).

Typical public Internet access currently includes linking a call from a subscriber to its Internet service provider (ISP) via the telephone network. In linking the call, the subscriber employs his or her modem to dial the number of a modem bank of the service provider. The call is set up via the telephone network and terminated to the modem bank. An Internet protocol gateway operated by the ISP coupled to the modem bank then sets up a data session with the subscriber's computer which is coupled to the subscriber's modem, such session set up is provided across the telephone network. With the session established, access to the Internet is then provided.

Many Internet service providers establish multiple modem banks, each of which couples to the telephone network at a corresponding location. For example, a large Internet service provider may include modem banks in the cities of Dallas, Richardson, Arlington, Fort Worth and other cities in the greater Dallas area. These modem banks allow most users to access the Internet service provider via a local phone call. However, most Internet service providers limit the access to each of these modem banks to locally registered subscribers. Thus, for example, a subscriber living in Richardson may only have access to the Richardson modem bank. If the subscriber is traveling away from Richardson and desires to access its Internet service provider, he or she may have to dial long distance into the Richardson modem bank.

Traveling subscribers may also be given access to his or her Internet service providers via a toll free number (e.g., 800, 888, etc.). However, while the subscriber does not pay telephone network toll charges for the call, he or she pays the Internet service provider based upon his or her usage. Thus, the user, in effect, pays for the toll charges via the usage fee. However, this transaction provides little or no benefit to the Internet service provider since it must pay telephone network toll charges to the telephone company.

Calls made by subscribers to the toll free number are routed to a central modem bank that services the calls for the Internet session. For the duration of the call, the telephone network must provide access to the ISP, the call consuming valuable resources of the telephone network. Because Internet sessions typically last longer then a typical voice call, the telephone network must service the calls for a longer period of time which places additional burden on the telephone network.

Thus, there exists a need in the art for a system and related operations in which Internet session calls routed within a telephone network consume fewer resources of the telephone network and less adversely affect operation of the telephone network.

SUMMARY OF THE INVENTION

Thus, to overcome the shortcomings of the prior operations, a telephone network constructed according to the present invention includes call redirection functions that redirect calls intended for a toll-free-number or central number of an Internet Service Provider (ISP) to one of a plurality of available Internet Protocol (IP) gateways operated by the ISP. In performing the call redirection, various telephone network components and/or ISP components may be employed.

In a first embodiment, a call is received by the telephone network at an originating switch from a subscriber's terminal with a toll-free-number or a central number (TFN) for his or her ISP. The originating switch interacts with a coupled service switching point (SSP) of the signaling network, requesting a number lookup for the DN corresponding to the TFN. The signaling network responds with the DN and the call is routed via the signaling network to a destination switch corresponding to the DN.

The destination switch (or coupled SSP) however, instead of completing the call, redirects the call to a new IP gateway. In redirecting the call, the destination switch responds to the new call request with a release message that includes a cause indication, the new called number (CLD) of the new IP gateway and the IP address for the subscriber to use with the IP gateway. The telephone network then releases the call back towards the originating switch for redirection. The originating switch, or some other switch on the route from the originating switch to the destination switch, recognizes the release-and-link call and processes it accordingly. The switch that processes the request delivers the call to the new IP gateway. The IP gateway may be configured to utilize the IP address provided, or may dynamically assign an IP address for the subsequent session. The Internet session is then set up and serviced between the IP gateway and the subscriber's terminal.

In a second embodiment of the present invention, the call is first routed to a PBX operated by the ISP and the PBX redirects the call to a new IP gateway instead of the destination switch. The PBX then participates in selecting the new IP gateway, in selecting the IP address and in releasing the call from the destination switch.

In a third embodiment, the signaling network itself redirects the call to a new IP gateway. In such case one or more signaling network elements operate to redirect the call prior to its being routed to the destination switch. Such redirection may be performed when a database lookup is initially performed using the TFN. In such case, the database response returns a redirection message that includes a cause indication, the CLD and an IP address to use in the Internet session.

The call redirection may be static or may be dynamic. In static call redirection, all calls are redirected to a single IP gateway. In dynamic call redirection, one of a plurality of available IP gateways is selected based upon operating conditions. In making such selection, IP gateway loading, IP gateway availability, telephone network loading, telephone network availability and telephone network routing costs are considered.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
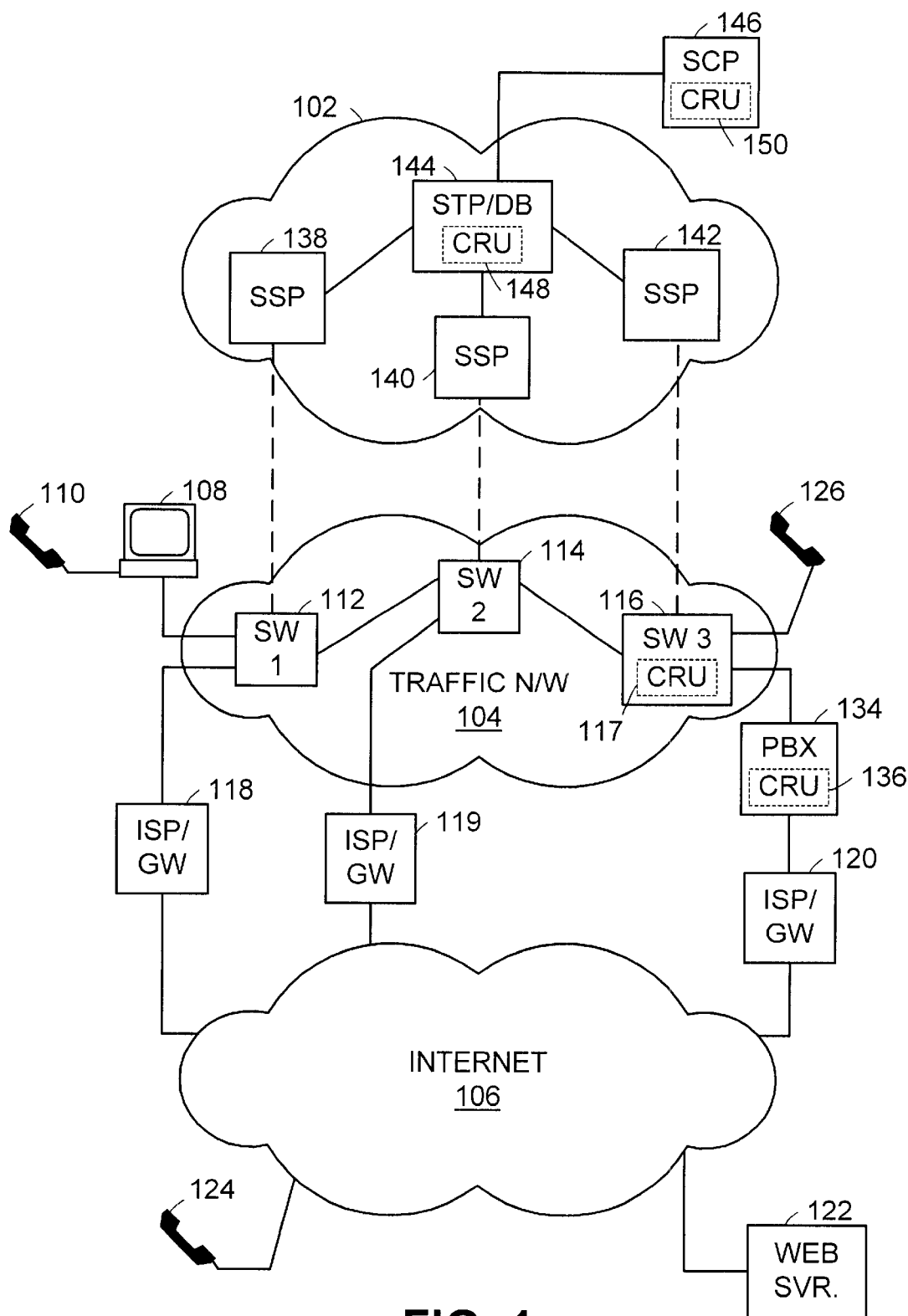
FIG. 1 is a block diagram illustrating generally a telephone signaling network, telephone traffic network and the Internet, the combination of which are operated according to the present invention.

FIG. 1 is a block diagram illustrating generally a telephone signaling network 102, a telephone traffic network 104 and the Internet 106, the combination of which are operated according to the present invention. As is generally known, telephone networks may be segregated into a traffic network 104 that carries call traffic and a signaling network 102 that provides signaling functions employed to route calls and to otherwise monitor and manage operation of the traffic network 104. Northern Telecom Limited as well as other vendors support such an architecture and the structure has been standardized (to some extent) to allow such network construction to extend across platforms. A particular standard that has been developed for the signaling network 102 (that may be employed in conjunction with the present invention) is the Common Channel Signaling Number 7 (CCS7) architecture. This and similar architectures may also be constructed and operated as an Advanced Intelligent Network (AIN).

The traffic network 104 includes a plurality of digital multiplex switches (SWs) 112, 114 and 116 which are also referenced as SW1, SW2 and SW3, respectively. The digital switches 112–116 are interconnected by traffic trunks which carry the calls from digital switch to digital switch in the traffic network 104. The operation of the traffic network 104 is typically performed using circuit switching operations, as compared to the signaling network 102 which typically operates in a packet switched manner. The Internet 106, as well, operates in a packet switched manner.

The digital switches 112–116 intercouple with the signaling network 102 via Service Switching Points (SSPs) 138, 140 and 142, respectively, which serve as entrance points to the signaling network 102 for the digital switches 112–116. These SSPs 138, 140 and 142 intercouple with other signaling network elements via the signaling network 102 infrastructure. Other signaling network elements include a Signal Transfer Point (STP) 144 and a Service Control Point (SCP) 146. The STP 144 (typically, the signaling network 102 includes multiple STPs) routes traffic in the signaling network 102. The SCP 146 (often, one of many SCPs) serves as a centralized network element in the signaling network 102 architecture from which various signaling network operations may be performed. For example, the signaling network elements may call upon the SCP 146 to perform functions of the AIN in transaction processing.

The traffic network 104 couples to the Internet 106 via modem connections (not shown) and Internet gateways (IP gateways) 118, 119 and 120 that, for the purposes of the present invention may be operated by a common Internet Service Provider (ISP). However, many additional IP gateways (operated by differing IPSs) interface the Public Switched Telephone Network (PSTN) to the Internet 106. These IP gateways 118–120 service Internet data sessions, Internet Protocol telephone service, Internet based video teleconferencing and various other operations in which the Internet 106 is employed as a portion of a traffic path between two locations. As is shown, IP gateway 118 couples SW1 112 to the Internet 106, IP gateway 119 couples SW2 114 to the Internet 106 and IP gateway 120 couples SW3 116 to the Internet 106 via a Private Branch Exchange (PBX) 134. The construction of both IP gateways and PBXs is generally known and will be discussed herein only as related to the present invention.

FIG. 1 also shows terminal devices and computers that are used in operations according to the present invention. As shown, a computer 108 couples to SW1 112 via a modem (not shown). Further, telephone 110 couples to computer 108, the telephone 110 used to service Internet Protocol (IP) telephony service. A standard telephone 126 couples to SW3 116. Also shown is an IP telephony terminal 124 that couples directly to the Internet. A web server 122 also couples to the Internet 106.

In a "surfing" operation, after Internet access has been established, a subscriber may use computer 108 to interact with web server 122 to download web pages and other content. Further, a subscriber may use telephone 110 to communicate with a user of telephone 124 in an Internet Telephony call. Moreover, the subscriber may use phone 110 in an Internet Telephony call with a user of phone 126, the call being routed through both the traffic network 104 and the Internet 106. As is readily apparent, many varied operations that employ the Internet 106 are supported by the structure illustrated in FIG. 1.

According to the present invention, a subscriber calls his or her ISP requesting access to the Internet 106. This call is placed based upon a toll-free-number or central number for the ISP (referred to as the "TFN"). However, this call would require using telephone system resources in a non-efficient manner. Alternately, this call would be routed to an overloaded IP gateway or to an IP gateway that is out of service. Thus, the call is redirected from its original destination to a new IP gateway coupled to an alternate location on the traffic network 104. Such redirection is performed via signaling network 102 operations and/or SW operations, these operations facilitated by at least one call redirection unit (CRU) constructed according to the present invention.

The redirection of calls may be performed statically such that all calls are redirected to a particular new IP gateway. Further, the redirection of calls may be performed dynamically such that calls are redirected to a new IP gateway depending upon operating criteria. Such operating criteria includes, for example, proximity of the subscriber to each of a plurality of IP gateways 118, 119 and 120 across the traffic network 104, the cost of routing the call across the traffic network 104, the loading levels of the available IP gateways and he current outages of the ISP's IP gateways, among other criteria.

FIG. 1 shows various locations of CRUs that are constructed and deployed according to the present invention. The CRU may reside in various locations in the signaling network 102 and/or the traffic network 104. In a first embodiment, a CRU 117 resides in a SW, e.g., SW3 116 and/or its coupled SSP 142. In this embodiment, a call is made from the computer 108, for example, to a toll-free or central number for the ISP. Based upon this toll-free or central number, the signaling network 102 determines a dialed number (DN) for the ISP and attempts to set up the call with the SW3 116 corresponding to the DN. The CRU 117 present in the SW3 116 (or coupled SSP 142) performs a "release-and-link" operation which releases the incoming subscriber call and links it to a new IP gateway operated by the ISP (or to another IP gateway to which it may otherwise send its subscribers for service).

Such release-and-link service may be programmed in the SW3 116 or may be employed via switch configuration datafill. Under this release-and-link service, the SW3 116 would release the call directed to it and link the call to the Internet 106 via another SW, e.g., SW1 112. In this release-and-link service, the SW3 116 issues an SS7 ISUP REL message which includes three additional components. A first component is a CAUSE INDICATOR which is a parameter that identifies the release and link IP calls to the switches in the traffic network 104 and the signaling network 102. A second component is a newly determined called number (CLD) for the SW that will couple the redirected call to a serving IP gateway. A third component is the IP address of the ISP that the subscriber is to use at the new IP gateway.

In a second embodiment, a CRU 136 resides in a PBX 134 operated by the ISP itself and performs the call redirection. Upon receipt of a call set up request from SW3 116 based upon a call from a subscriber, e.g., computer 108, CRU 136 issues a Primary Rate Interface (PRI) Release message that includes the CAUSE INDICATOR, the CLD and the IP address. Because the ISP operates the PBX 134, it may more easily monitor the availability and loading on its IP gateways, the cost of routing subscriber calls via the traffic network 104 than could typically be performed by the serving SW.

While in both the first and second embodiments the call is routed at least as far as the destination SW corresponding to the DN of the call, in a third embodiment, the call is intercepted in the signaling network 102 prior to reaching a destination SW. In such an embodiment, a CRU 148 may be implemented in a STP 144 or STP database in which a called number (e.g., toll free number of ISP, central number for the ISP, etc.) is used to determine a DN corresponding to a serving SW. The STP 144 or STP database, upon receipt of the called number in a TCAP QUERY or similar operation, instead of returning the DN corresponding to the toll free number or central number for the ISP, determines that the call should be handled according to the present invention and redirects the call via a TCAP QUERY RESPONSE. In such embodiment, the TCAP QUERY RESPONSE includes the CAUSE INDICATOR, the CLD and the IP address. In this embodiment, a CRU 150 may also be implemented on the SCP 146 serving the signaling network 102.

Figure 2A:
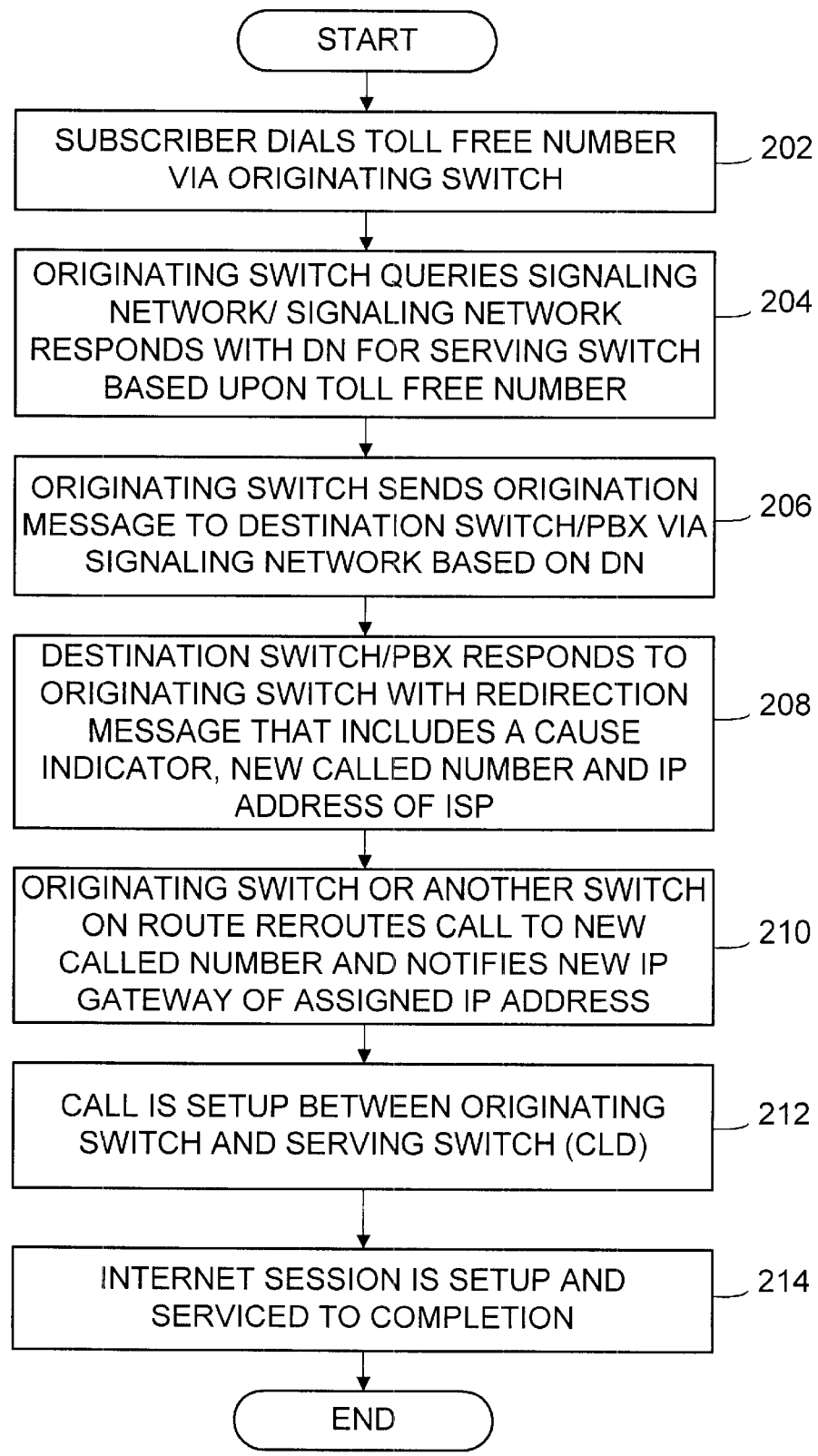
FIG. 2A is a logic diagram illustrating operation of a telephone traffic network and a telephone signaling network according to a first or second embodiment of the present invention in rerouting a call intended for an Internet service provider.

FIG. 2A is a logic diagram illustrating operation of a telephone traffic network and a telephone signaling network according to the first or the second embodiment of the present invention in rerouting a call intended for an Internet service provider. As is recalled from the discussion with reference to FIG. 1, in the first embodiment, a subscriber call is released and linked via operation by a SW/SSP corresponding to the DN of the call. Further, as is recalled, in the second embodiment, a subscriber call is released and linked via operation of a PBX which corresponds to the DN of the subscriber call.

Operation commences at step 202 where a subscriber dials a toll free number (TFN) (or central number) corresponding to its ISP via a connection with an originating switch. In making this call, the subscriber desires to initiate an Internet session, IP telephony session or another session in which Internet access is required. At step 204, the originating switch queries the signaling network for a DN corresponding to the toll free number (or central number) for the subscriber's ISP. Further, at step 204, the signaling network responds with a DN for a serving SW corresponding to the ISP gateway.

At step 206 the originating switch sends an origination message to the destination switch/PBX corresponding to the DN of the ISP via the signaling network. The destination switch/PBX responds at step 208 with a redirection message that includes a CAUSE INDICATOR, a new CLD (for a serving SW/IP gateway) and an IP address that the subscriber is to employ at the serving IP gateway. As was previously discussed, in redirecting the call to a particular IP gateway, the CRU corresponding to the destination switch or PBX may perform static or dynamic IP gateway selection.

Next, at step 210, based upon contents of the redirection message, the originating switch or another switch located on the route from the destination switch to the originating switch routes the call (via the signaling network) to a new destination switch corresponding to the CLD and notifies the new IP gateway of the IP address that has been assigned for the current Internet session. Then, at step 212 the call is set up between the originating switch and the destination switch/serving IP gateway. Once the call is set up, the subscriber's computer and the IP gateway communicate to set up the Internet session at step 214. At such time, the new IP gateway notifies the subscriber's computer of the IP address that has been assigned for session. The Internet session is then serviced to completion, at which point operation ends.

Figure 2B:
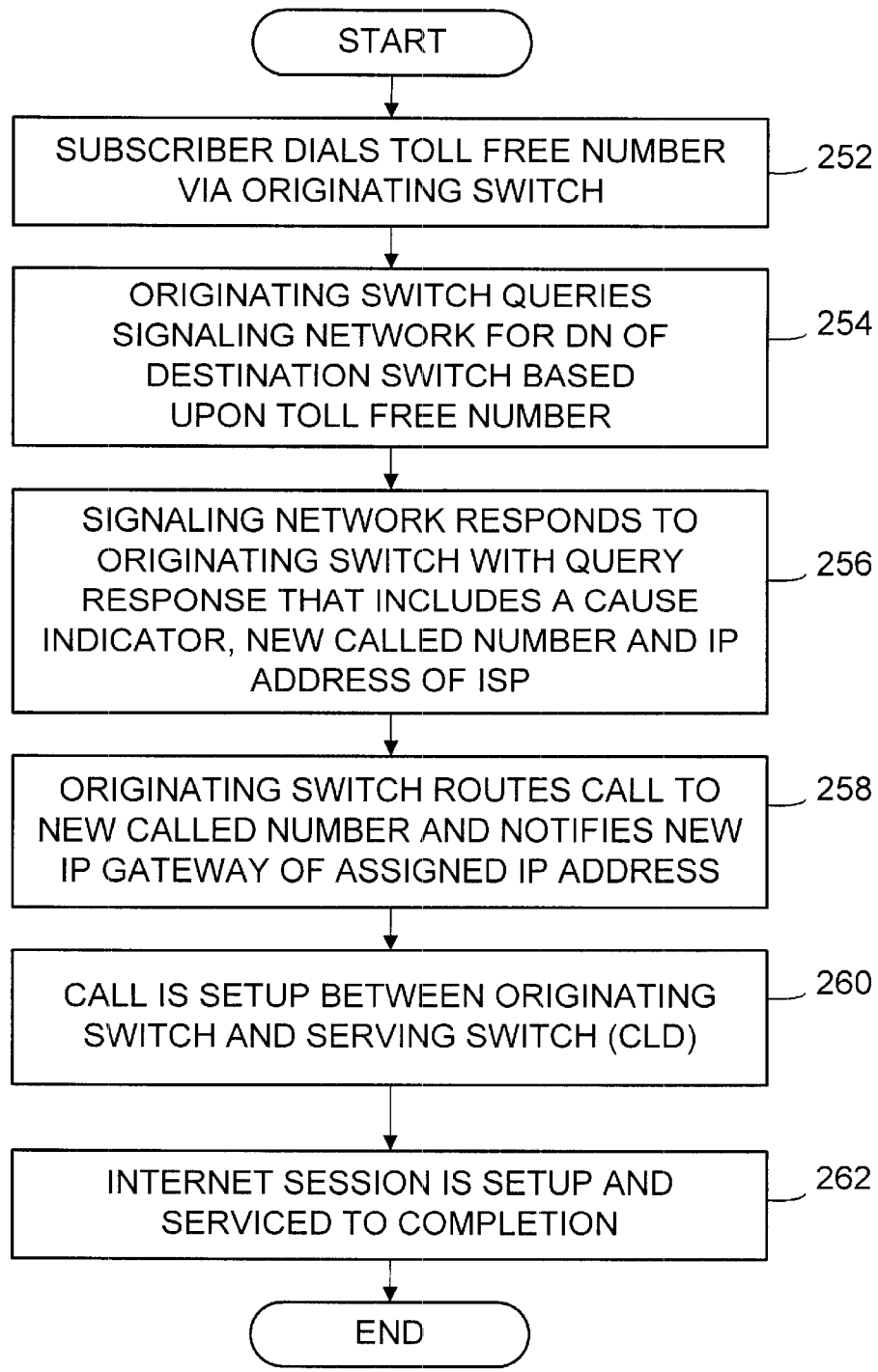
FIG. 2B is a logic diagram illustrating operation of a telephone traffic network and a telephone signaling network according to a third embodiment of the present invention in rerouting a call intended for an Internet service provider.

FIG. 2B is a logic diagram illustrating operation of a telephone traffic network and a telephone signaling network according to a third embodiment of the present invention in rerouting a call intended for an Internet service provider. As is recalled from the discussion with reference to FIG. 1, in the third embodiment, a subscriber call is redirected by the signaling network based upon the toll-free-number or central number dialed by the subscriber.

Operation commences at step 252 where a subscriber dials a toll free number (or central number) corresponding to its ISP via an originating switch. In making this call, the subscriber desires to initiate an Internet session, IP telephony session or another session in which Internet access is required. At step 254, the originating switch queries the signaling network for a DN corresponding to the toll free number (or central number) for the ISP. At step 256 the signaling network responds to the originating switch with a query response that includes a cause indicator, a new CLD and an IP address of a new IP gateway that will service the Internet session.

At step 258 the originating switch routes the call to the destination switch/new IP gateway corresponding to the new CLD and notifies the new IP gateway of the IP address that has been assigned for the current Internet session with the IP gateway. Then, at step 260 the call is set up between the originating switch and the serving switch. Once the call is set up, the subscriber's computer and the new IP gateway communicate to set up the Internet session at step 262. At this point, the new IP gateway notifies the subscriber's computer of the IP address to use in the session. The Internet session is then serviced to completion, at which point operation ends.

Figure 3:
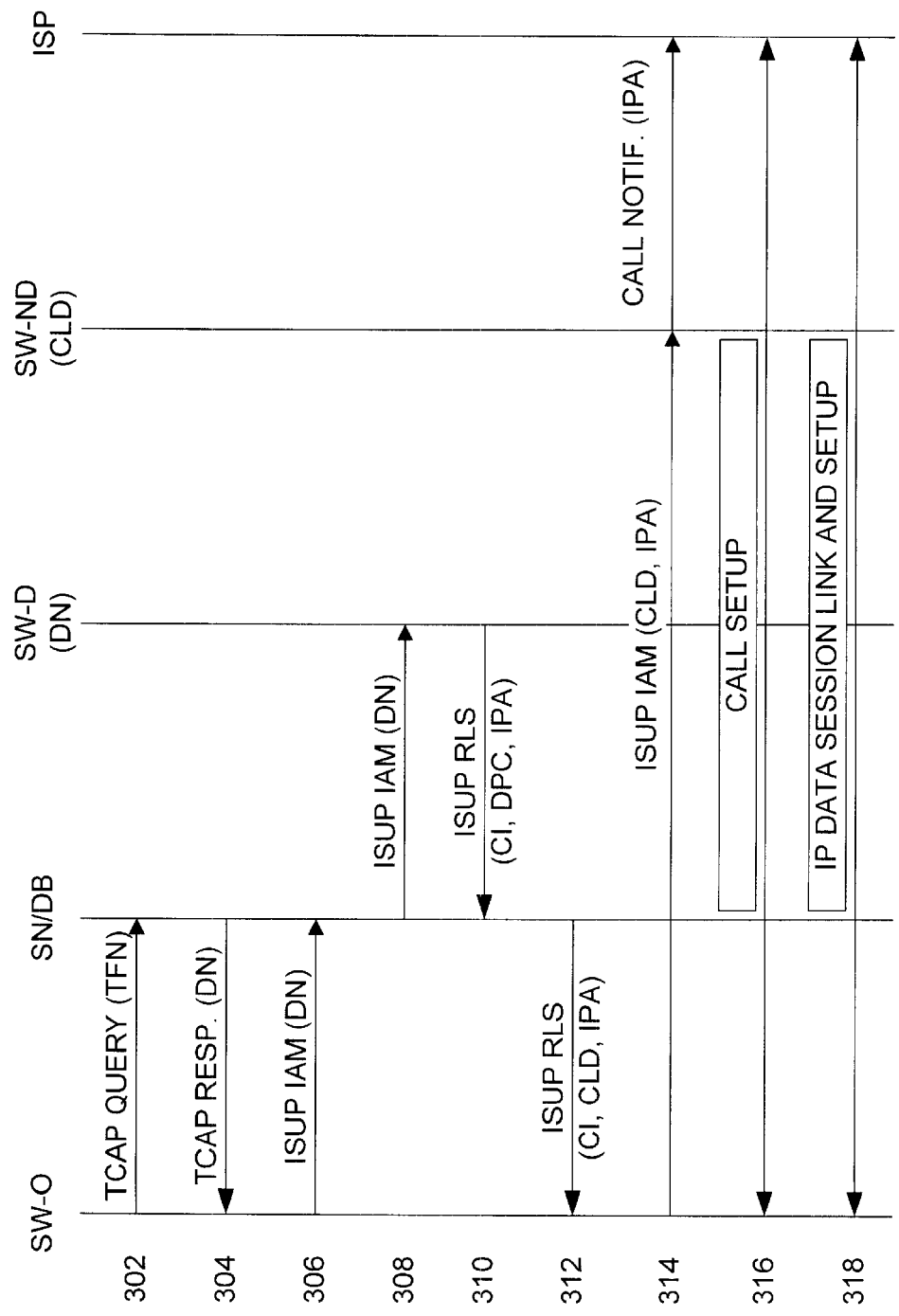
FIG. 3 is a message flow diagram illustrating operation of a telephone traffic network and a telephone signaling network according to the first embodiment of the present invention in rerouting a call intended for an Internet service provider in which a first destination switch redirects the call.

FIG. 3 is a message flow diagram illustrating operation of a telephone traffic network and a telephone signaling network according to the first embodiment of the present invention in rerouting a call intended for an Internet service provider in which a first destination switch redirects the call. At 302, the subscriber initiates a call to his or her ISP by dialing a telephone number corresponding to the ISP. The originating switch sends a TCAP QUERY message to the signaling network requesting the DN for the telephone number. A database lookup is performed by the signaling network, a DN is determined for the telephone number and the DN is returned in a TCAP QUERY RESP message at 304. Based upon the DN, the originating switch sends an ISUP IAM (Initial Access Message) to the signaling network at 306 which the signaling network terminates to a corresponding destination switch at 308.

Upon receipt of the ISUP IAM, a CRU contained in the destination switch determines that an ISUP IAM has been received intended for the TFN number of the ISP. The CRU then determines which IP gateway will service the call and redirects the call accordingly. In redirecting the call, the CRU responds at 310 to the ISUP IAM with an ISUP RLS (release) message that is relayed to the signaling network. The ISUP RLS message includes a CAUSE INDICATOR, the new CLD and an IP address to be employed in conjunction with the new IP gateway. The originating switch receives the ISUP RLS message at 312. At 314 the originating switch sends an ISUP IAM via the signaling network to the destination switch which corresponds to the CLD. In response, the destination switch notifies the new IP gateway of the incoming call. The ISUP IAM includes the CLD of the new IP gateway and of the IP address to be used by the subscriber in the subsequent data call. Further, in notifying the new IP gateway of the call, the destination switch notifies the new IP of the IP address to be used. At 316, the call is set up between the subscriber and the new IP gateway via the originating switch and the destination switch. Once the call is set up, the IP data session is linked, set up and serviced to completion at 318.

Figure 4:
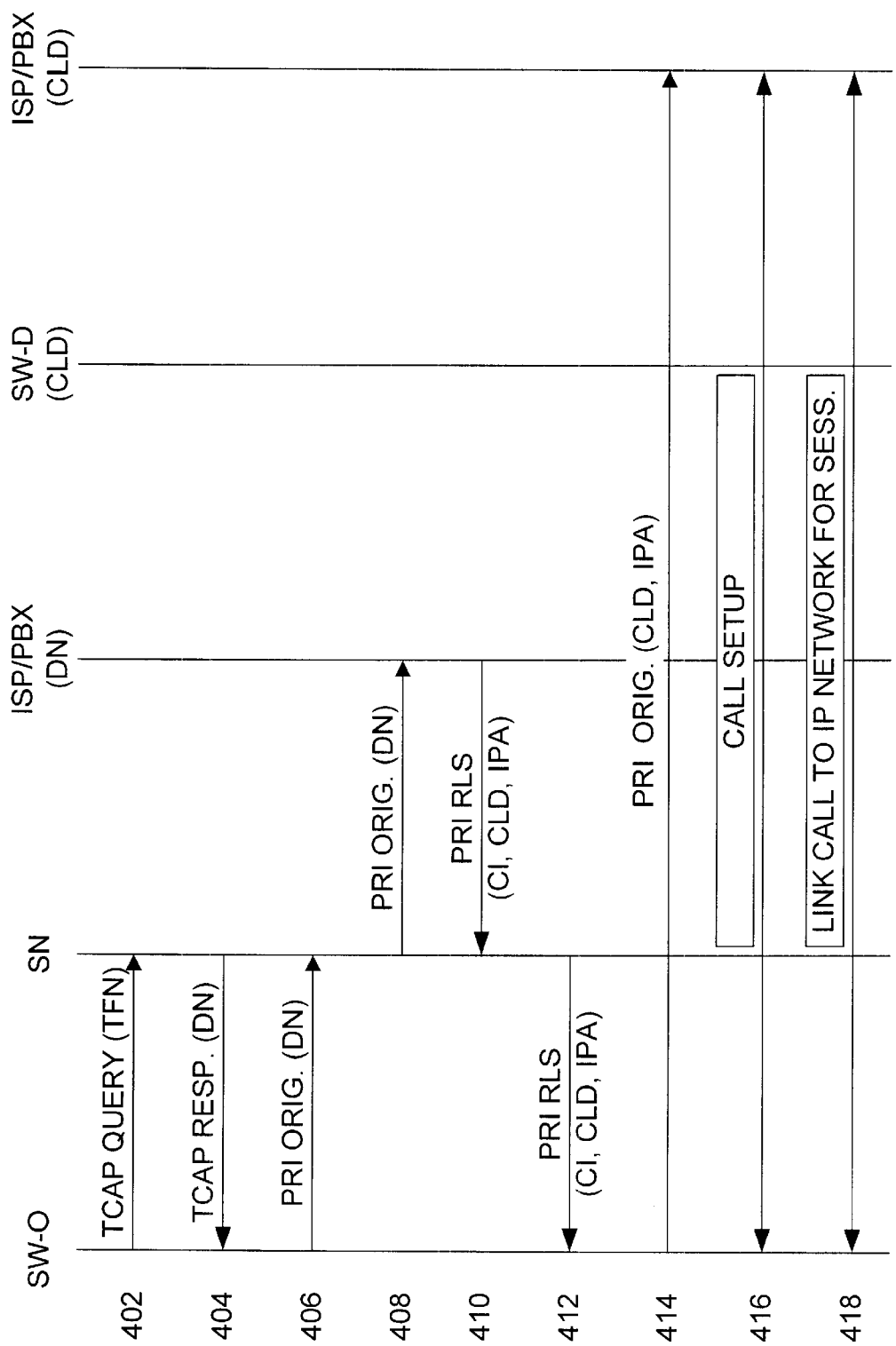
FIG. 4 is a message flow diagram illustrating operation of a telephone traffic network and a telephone signaling network according to the second embodiment of the present invention in rerouting a call intended for an Internet service provider in which a Private Branch Exchange redirects the call.

FIG. 4 is a message flow diagram illustrating operation of a telephone traffic network and a telephone signaling network according to the second embodiment of the present invention in rerouting a call intended for an Internet service provider in which a Private Branch Exchange redirects the call. At 402, the subscriber initiates a call to his or her ISP by dialing a telephone number corresponding to the ISP. The originating switch sends a TCAP QUERY message to the signaling network requesting the DN for the telephone number. A database lookup is performed by the signaling network, a DN is determined for the telephone number and the DN is returned in a TCAP QUERY RESP message at 404. Based upon the DN, the originating switch sends a Primary Rate Interface (PRI) Origination message to the signaling network at 406. The signaling network routes the PRI ORIG message to the PBX of the ISP via a destination switch at 408.

Upon receipt of the PRI ORIG message, a CRU contained in the ISP's PBX determines that a PRI ORIG has been received that is intended for the central number of the ISP. The CRU then determines which IP gateway will service the call and redirects the call accordingly. In redirecting the call, at 410, the CRU responds to the PRI ORIG message with an PRI RLS (Release) message in which a CAUSE INDICATOR, the new CLD and the IP address to be employed. The originating switch receives the PRI RLS message at 412 and at 414 sends an PRI ORIG message to the destination switch (may also be a PBX) corresponding to the CLD and the destination switch notifies the ISP IP gateway of the incoming call. Contained in the PRI ORIG message is the CLD and the IP address to be used with the new IP gateway. At 416, the call is set up between the subscriber and the IP gateway via a destination switch and the PBX. Once the call is set up, the IP data session is linked, set up and service to completion at 418.

Figure 5:
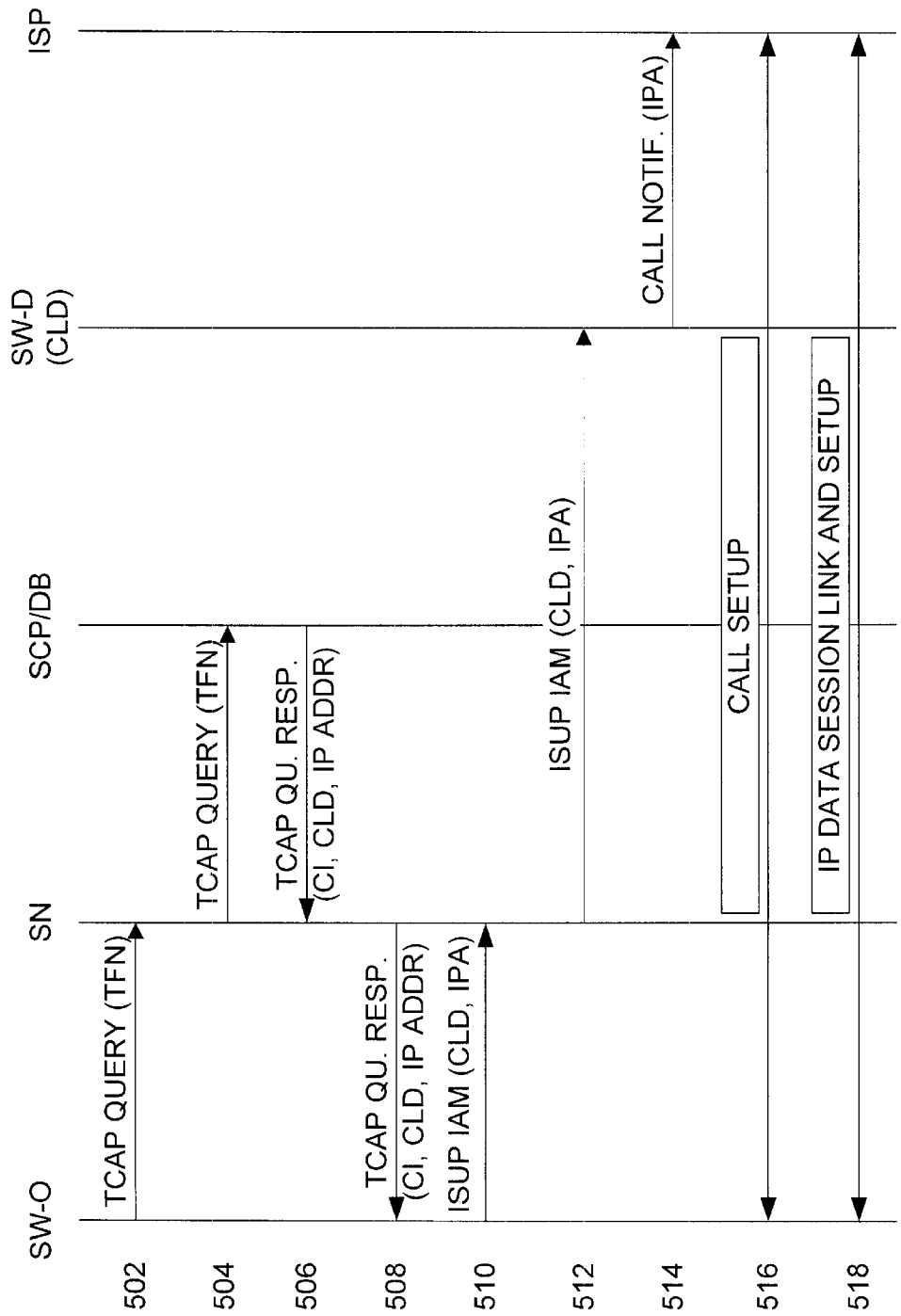
FIG. 5 is a message flow diagram illustrating operation of a telephone traffic network and a telephone signaling network according to the third embodiment of the present invention in rerouting a call intended for an Internet service provider in which a signaling network element redirects the call.

FIG. 5 is a message flow diagram illustrating operation of a telephone traffic network and a telephone signaling network according to the third embodiment of the present invention in rerouting a call intended for an Internet service provider in which a signaling network element redirects the call. At 502, the subscriber initiates a call to his or her ISP by dialing a telephone number corresponding to the ISP. The originating switch sends a TCAP QUERY message to the signaling network requesting the DN for the telephone number. The signaling network routes the TCAP QUERY message to a STP database or a SCP at 504.

Upon receipt of the TCAP QUERY message, a CRU contained in the STP database or the SCP determines that a TCAP QUERY message requests the DN for the telephone number of the ISP. The CRU then determines which IP gateway will service the call and redirects the call accordingly. In redirecting the call, the CRU responds to the TCAP QUERY message with an TCAP QUERY RESPONSE message in which a CAUSE INDICATOR, the new CLD and the IP address to be employed at 506. The originating switch receives the TCAP QUERY RESPONSE message at 508 and at 510 sends a ISUP IAM message to signaling network with the new CLD and the IP address.

At 512, the signaling network then routes the ISUP IAM message to the destination switch corresponding to the CLD. The destination switch then notifies the ISP of the incoming call at 514 and passes the IP address to the ISP. At 516, the call is set up between the subscriber and the new IP gateway of the ISP via the destination switch. Once the call is set up, the IP data session is linked, set up and service to completion at 518.

Figure 6:
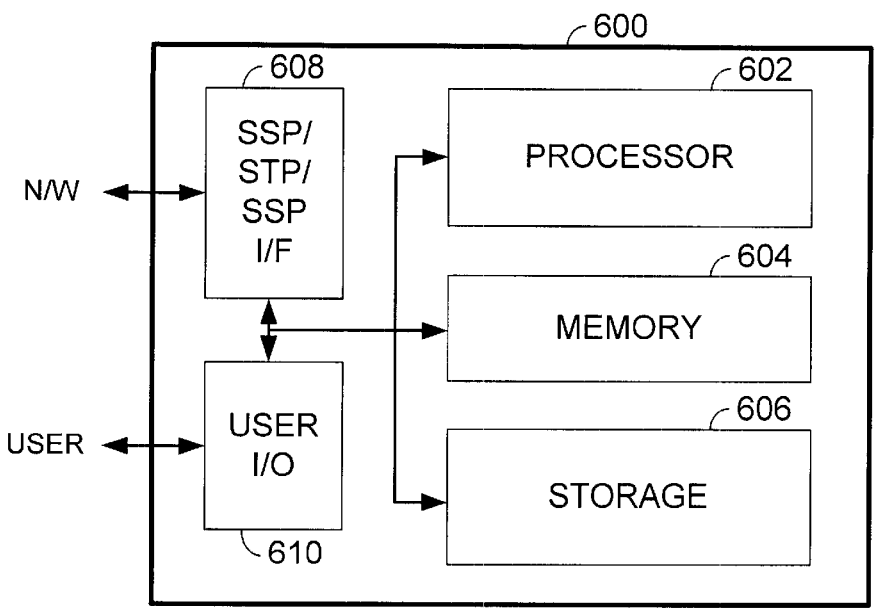
FIG. 6 is a block diagram generally illustrating the construction of a signaling network element that performs call redirection operations according to the present invention.

FIG. 6 is a block diagram generally illustrating the construction of a signaling network element that performs call redirection operations according to the present invention. The signaling network element (SNE) 600 may be a STP, an SSP, a STP database or a SCP. In any of these embodiments, the SNE 600 is a digital device and includes a processor 602, memory 604, storage 606, an Interface 568 and an Input/Output 610. These devices are intercoupled via a communication path that may be a bus.

The processor 602 may be one or more processing devices that are selected and intercoupled to accomplish the call redirection functions according to the present invention as well as other functions required of the SNE 600. The memory 604 stores instructions and data and may be Dynamic Random Access Memory, Static Random Access Memory or other memory that is usable by the processor 602 during its ongoing operations. The storage 606 provides the SNE 600 with long term storage of data and instructions and may be magnetic disk storage, optical storage, tape storage or other long term storage devices.

The Interface 608 couples the SNE 600 to other elements of the signaling network including SSPs, SCPs and STPs. Since the signaling network is packet switched, the Interface 608 supports packet switching operations consistent with the type of packet switching supported by the signaling network. Finally, the SNE 600 includes a user Input/Output interface that interfaces the SNE 600 to a user. Such interface may couple the SNE 600 to a console (either locally or remotely) to allow a user to program and modify operations of the SNE 600.

The call redirection functions of the SNE 600, in one embodiment, are accomplished by the processing of a set of software instructions that are stored in the SNE 600. These software instructions are stored in the storage 606 and the memory 604 and selectively executed by the processor 602. In executing these operations, the processor 602 uses the Interface 608 to interact with coupled SSPs, STPs, STP databases and, in some operations, a coupled SCP. These operations have been previously described with reference to FIGS. 1 through 5. In another embodiment, at least some of the operations are performed by dedicated hardware components that have been pre-programmed or pre-wired to perform the operations.

Figure 7:
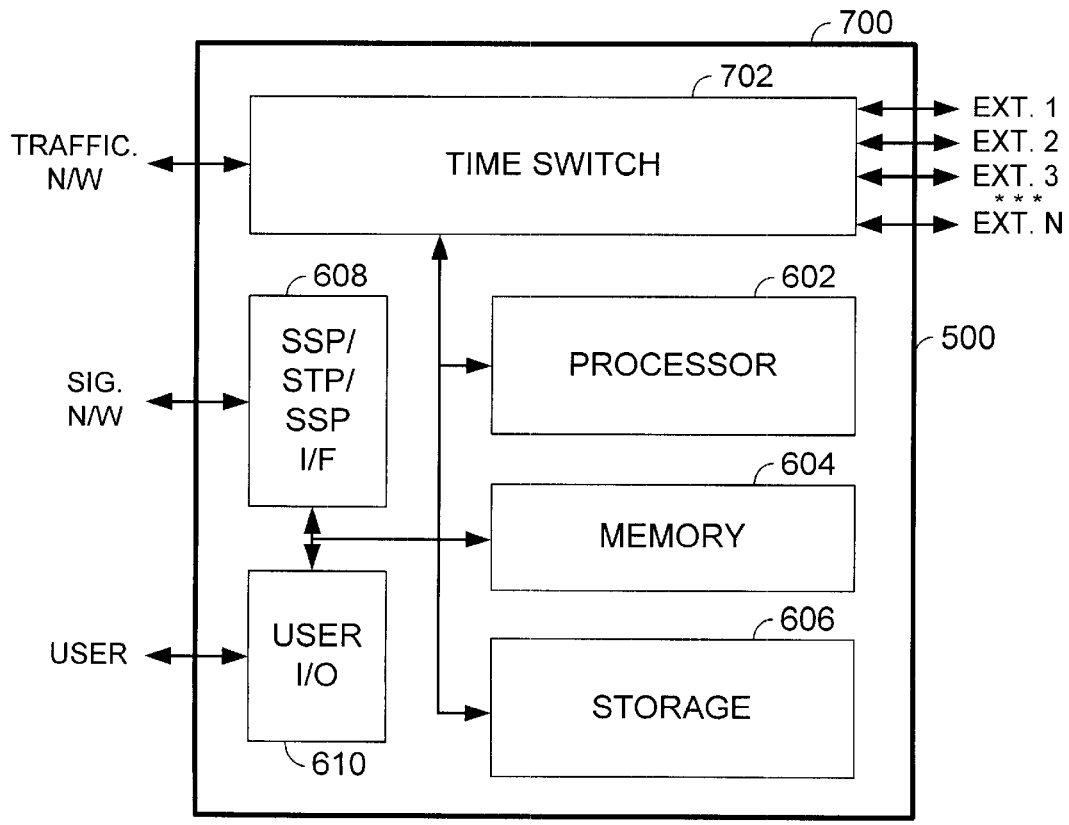
FIG. 7 is a block diagram generally illustrating the construction of a Private Branch Exchange (or switch) that performs call redirection operations according to the present invention.

FIG. 7 is a block diagram generally illustrating the construction of a Private Branch Exchange (or switch) that performs call redirection operations according to the present invention. The construction of the PBX 700 is similar to that of the SNE 600. Thus, those components previously discussed retain common numbering convention and will not be discussed again with reference to FIG. 7. The PBX 700, however, also includes a time switch 702 that performs time based switching operations to couple a plurality of extensions to the traffic network. The construction of PBXs is generally known.

According to the present invention, the PBX 700 also performs call redirection operations. In performing these call redirection operations, the PBX 700 performs operations based upon instructions stored in its memory 604 and storage. Interaction with the signaling network is performed via interface 608 and calls are routed via the time switch 702. In another embodiment, at least some of the operations are performed by dedicated hardware components that have been pre-programmed or pre-wired to perform the operations.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. In a telephone network having a plurality of intercoupled switches that form a traffic network and a plurality of intercoupled signaling network elements that form a signaling network, a method for redirecting a call intended for an Internet Service Provider, the method comprising:
   receiving a call from a terminal coupled to an originating switch of the plurality of switches, the call intended for an Internet Service Provider coupled to a destination switch;
   determining that the call is to be redirected;
   selecting a new Internet Protocol gateway to service the call;
   redirecting the call to the new Internet protocol gateway via the telephone network;
   providing the new Internet protocol gateway with an IP address to be used by the terminal; and
   terminating the call from the terminal to the new Internet protocol gateway.

2. The method of claim 1, wherein in selecting the new Internet protocol gateway, the new Internet protocol gateway is statically selected.

3. The method of claim 1, wherein in selecting the new Internet protocol gateway the new Internet protocol gateway is selected from a plurality of Internet protocol gateways based upon operating criteria.

4. The method of claim 3, wherein the operating criteria is selected from the group consisting of Internet protocol gateway loading levels, Internet protocol gateway outages, telephone network routing costs and telephone network loading levels.

5. The method of claim 1, wherein determining that the call is to be redirected and selecting the new Internet protocol gateway are performed by a destination switch corresponding to the telephone number.

6. The method of claim 1, wherein determining that the call is to be redirected and selecting a new Internet protocol gateway are performed by a signal switching point of the signaling network.

7. The method of claim 1, wherein determining that the call is to be redirected and selecting a new Internet protocol gateway are performed by a Private Branch Exchange.

8. The method of claim 1, wherein determining that the call is to be redirected and selecting a Internet protocol gateway are performed by a signaling network element.

9. The method of claim 8, wherein the signaling network element comprises a signal transfer point.

10. The method of claim 8, wherein the signaling network element comprises a signal control point.

11. The method of claim 8, wherein the signaling network element comprises a database.

12. For operation within a telephone network that includes a traffic network and a signaling network, a telephone network component comprising:
   a signaling network interface that interfaces the telephone network component to the signaling network;
   a processor adapted to execute instructions and to operate upon data; and
   memory adapted to store instructions and data, the memory storing instructions that cause the telephone network component to:
      receive a call from a terminal coupled to an originating switch of the plurality of switches intended for an Internet Service Provider;
      determine that the call is to be redirected;
      determine a new Internet protocol gateway;
      redirect the call to the new Internet protocol gateway via the telephone network; and
      provide the new Internet protocol gateway with an Internet protocol address to be used by the terminal.

13. The telephone network component of claim 12, wherein the telephone network statically selects the telephone number.

14. The telephone network component of claim 12, wherein the telephone network component selects the new Internet protocol gateway from a plurality of Internet protocol gateways based upon operating criteria.

15. The telephone network component of claim 14, wherein the operating criteria is selected from the group consisting of Internet protocol gateway loading levels, Internet protocol gateway outages, telephone network routing costs and telephone network loading levels.

16. The telephone network component of claim 12, wherein determining that the call is to be redirected and selecting a new Internet protocol gateway are performed by a destination switch.

17. The telephone network component of claim 12, wherein the telephone network component comprises a signal switching point of the signaling network.

18. The telephone network component of claim 12, wherein the telephone network component comprises a Private Branch Exchange and the telephone network component further comprises a time switch.

19. The telephone network component of claim 12, wherein the telephone network component comprises a switch of the traffic network and the telephone network component further includes a time switch.

20. The telephone network component of claim 12, wherein the telephone network component comprises a signaling network element.

21. The telephone network component of claim 20, wherein the signaling network element comprises a signal transfer point.

22. The telephone network component of claim 20, wherein the signaling network element comprises a signal control point.

23. The telephone network component of claim 20, wherein the signaling network element comprises a database.

* * * * *